US009160790B1

United States Patent
Abgrall et al.

(10) Patent No.: US 9,160,790 B1
(45) Date of Patent: Oct. 13, 2015

(54) METHODS AND SYSTEMS FOR DETERMINING AND CONTROLLING NETWORK DATA USAGE AT THE APPLICATION AND FEATURE LEVEL

(71) Applicant: Google Inc., Mountain View, CA (US)

(72) Inventors: JP Abgrall, Santa Clara, CA (US); Ashish Sharma, Mountain View, CA (US); Michael Gerard Morrissey, Atlanta, GA (US)

(73) Assignee: Google, Inc., Mountain View, CA (US)

( * ) Notice: Subject to any disclaimer, the term of this patent is extended or adjusted under 35 U.S.C. 154(b) by 277 days.

(21) Appl. No.: 13/653,307

(22) Filed: Oct. 16, 2012

Related U.S. Application Data

(60) Provisional application No. 61/548,189, filed on Oct. 17, 2011, provisional application No. 61/611,697, filed on Mar. 16, 2012.

(51) Int. Cl.
*G06F 15/173* (2006.01)
*H04L 29/08* (2006.01)
*H04L 12/801* (2013.01)

(52) U.S. Cl.
CPC ............ *H04L 67/1002* (2013.01); *H04L 47/19* (2013.01)

(58) Field of Classification Search
CPC ........................... H04L 47/19; H04L 67/1002
USPC .......................................................... 709/206
See application file for complete search history.

(56) References Cited

U.S. PATENT DOCUMENTS

| 8,484,568 | B2 | 7/2013 | Rados et al. |
| 2002/0083003 | A1* | 6/2002 | Halliday et al. ................. 705/52 |
| 2007/0081543 | A1* | 4/2007 | Brenes et al. .................. 370/401 |
| 2012/0195223 | A1* | 8/2012 | Raleigh .......................... 370/252 |

OTHER PUBLICATIONS

Unpublished U.S. Appl. No. 13/653,340, filed Oct. 16, 2012 entitled Methods and Systems for Determining, Controlling and Reporting Network Data Usage at the Application and Feature Level.

* cited by examiner

*Primary Examiner* — Yves Dalencourt
(74) *Attorney, Agent, or Firm* — Faegre Baker Daniels LLP

(57) ABSTRACT

An operating system of a computing device can include or operate in conjunction with a data usage service. The data usage service can determine the network data usage of applications and features of the applications and attribute the network data usage to the specific application and features of the specific application responsible for the network data usage. The data usage service can utilize the determined network data usage in order to control and adapt the network behavior of the application and features of the application.

17 Claims, 11 Drawing Sheets

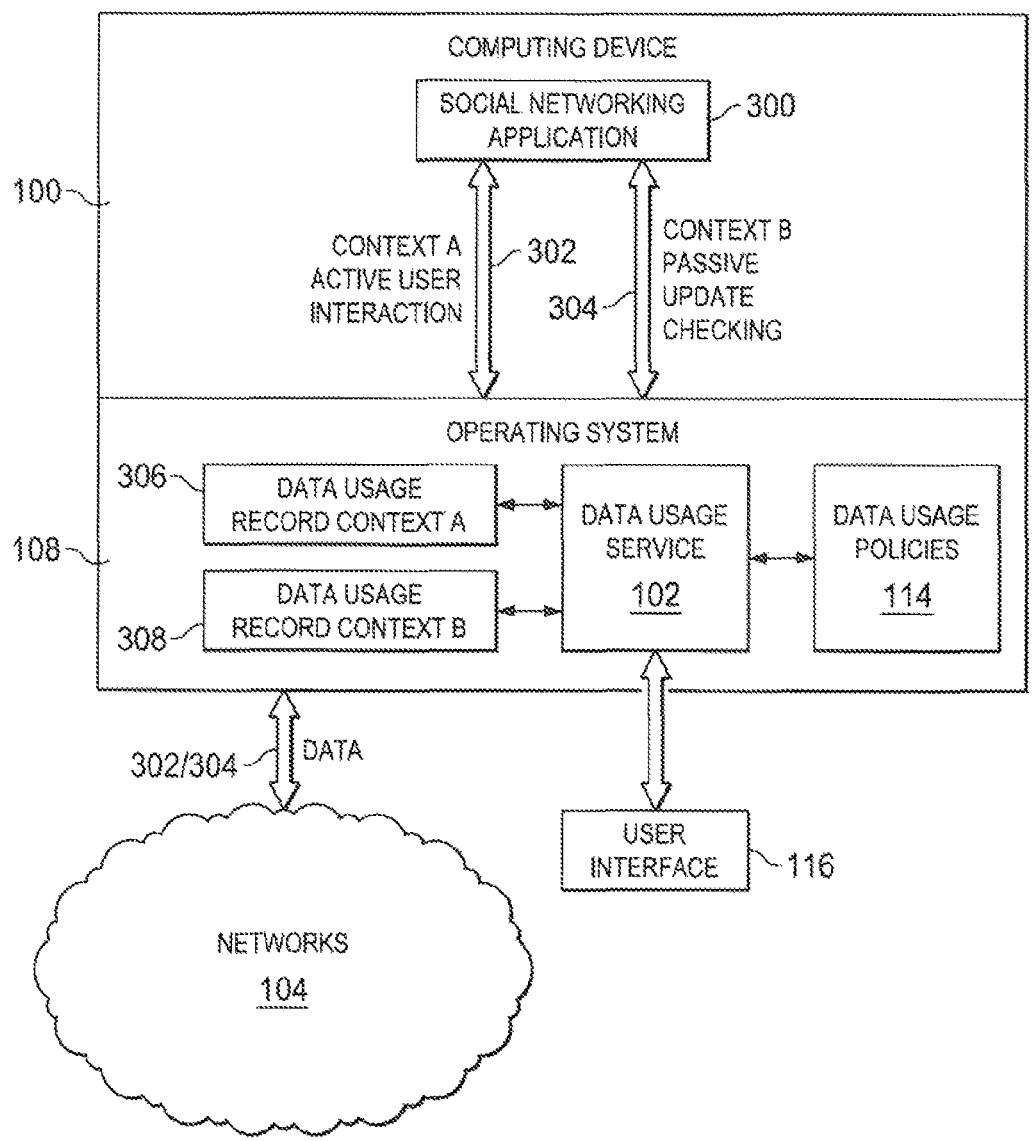

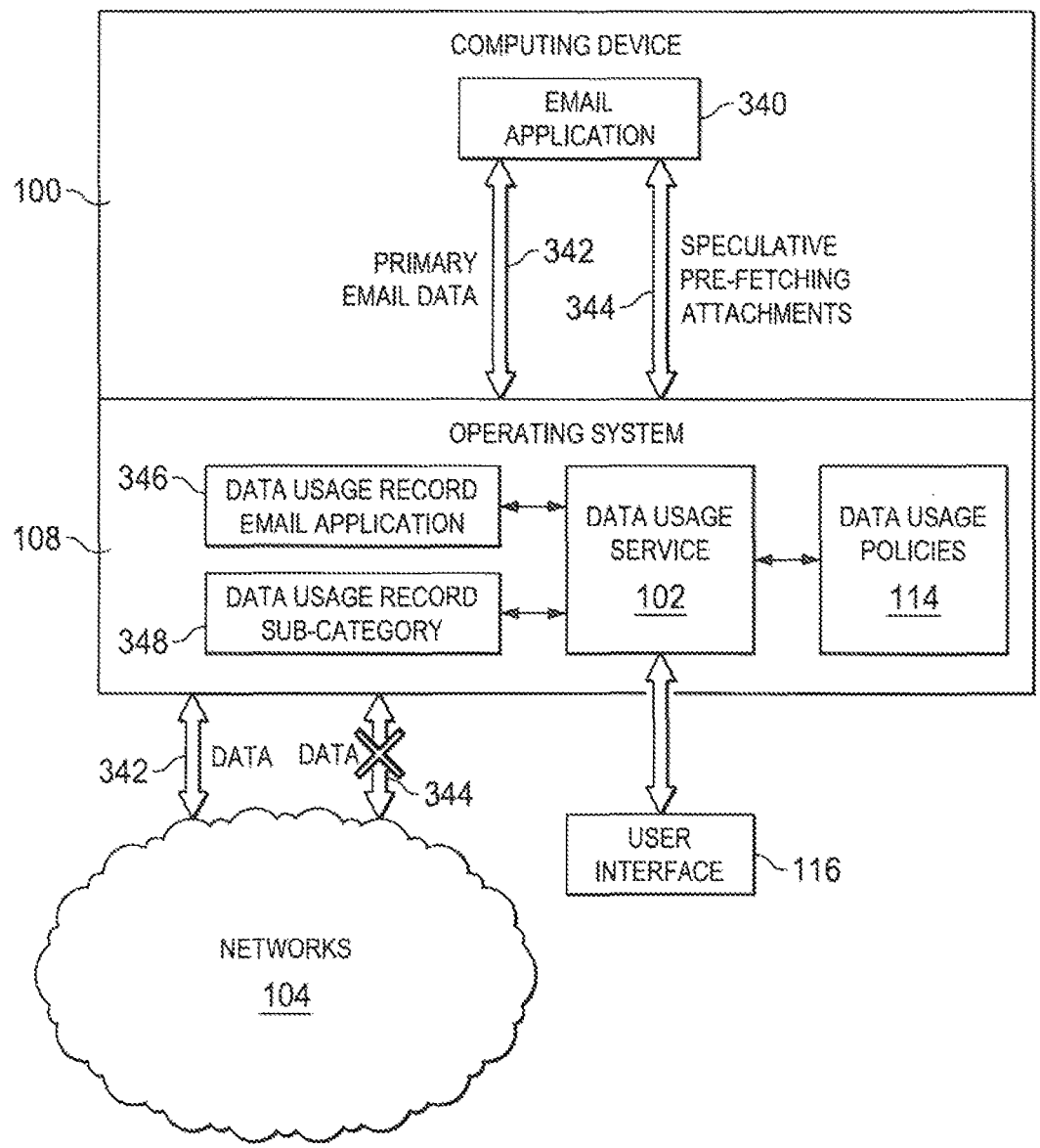

METHODS AND SYSTEMS FOR DETERMINING AND CONTROLLING NETWORK DATA USAGE AT THE APPLICATION AND FEATURE LEVEL

CROSS-REFERENCE TO RELATED APPLICATIONS

This application claims priority to U.S. Provisional Patent Application Serial Nos. 61/548,189, filed Oct. 17, 2011 and 61/611,697, filed on Mar. 16, 2012, the disclosures of which are incorporated in their entirety by reference herein.

TECHNICAL FIELD

This disclosure relates generally to determining and controlling the usage of network data bandwidth in computing devices.

BACKGROUND

The classification of network data flows on the Internet backbone has helped provide an insight into the trends of network usage over time based on applications, devices, geographies, and network types. Such efforts to study and control the network usage behavior relate to and are often aggregated over a large number of users on the Internet. Current computing devices, however, do not provide fine-grained visibility and control of network usage patterns on individuals' computing device where the network data flows originate.

There has been an exponential growth in the number of Internet connected devices in the past decade. For example, mobile devices, such as cellular telephones, tablet computers, laptops, etc., are increasingly using wireless networks to send and receive data. In the past, wireless network providers allowed unlimited data plans that charged a flat rate for sending and receiving data over the wireless network. The explosive growth in the data transmitted over the wireless network by mobile devices has led to the replacement of unlimited data plans with pay-per-use plans. These pay-per-use plans require that the users of the mobile devices pay by bandwidth used, for example, by the rate for GigaBytes (GB) per Month for typical cellular telephone plans, and the rate for Mega-Bytes (MB)/Hour for WiFi hotspots. This move towards pay-per-use plans has adversely affected users because of the overage charges that are incurred when a user unexpectedly exceeds the monthly quota of download and upload limits. Similarly, wired network providers may also offer plans which include quotas on network data usage.

More and more applications, e.g. social networking, online gaming, news/weather, used by mobile devices rely on sending and receiving data over the wireless networks. Some applications may cause excessive usage of the network, and, thus, cause the user to incur large and sometimes unexpected charges. Some governments are imposing rules that require wireless network providers to warn the user when such limits are being approached or exceeded. But from the user's perspective, it is not clear which application or feature of the application is causing the data usage in the wireless network.

The problem of attributing the data usage of an application is further complicated by the fact that sometimes separate applications, e.g. a mediaserver, download manager, or the operating system (OS) on the mobile device provide a network data exchange service to the application. To correctly account for data usage by the application, it becomes important to correctly attribute data usage to the application requesting the network data exchange service, and not the separate application providing the network data exchange service. Likewise, to control data usage, limits need to be imposed on the application requesting the network data exchange service, and not the separate application providing the network data exchange service.

Conversely, from an application developer's point of view, it is important to profile the data usage of their application. Because data exchanged over the network has an associated overhead in terms of the system setup costs (e.g. battery and cpu usage) and protocol overheads at each layer of the networking stack (e.g. hypertext transfer session (HTTP) session, transmission control protocol (TCP) handshake, and transmission control protocol/internet protocol (TCP/IP) headers for each packet), the ability to profile, control, and adapt the behavior of an application based on a data usage can be extremely useful for application developers. Applications, however, can themselves not determine how much data they are using, as the payload they want to transfer actually incurs an overhead caused by the protocols used. For example, some applications will request a secure HTTP (HTTPS) connection to a server, but the applications cannot determine how much extra data is used to establish a secure connection. Likewise, applications will use a connection for different types of transfers which don't all have the same importance, for example, speculatively pre-fetching the attachments of unread emails versus getting the actual subject lines needed to notify the user of an available email. In all these cases, it is difficult for the developer to know which parts of the application need to avoid costly traffic, and difficult for the end user to apply limitations on specific portions of an application's traffic.

Some OSes, e.g. Unix and Linux derived OSes, offer network filtering and quota handling at a coarse level. The OSes allow determining on specific networking interfaces, set quota limits that cut off traffic on the interfaces, allow filtering specific users, and specific protocols. Additionally, on mobile devices, some tools exist that will determine data usage globally for all applications as a whole. Data usage selecting/notifying apps can then disable access to the network for all applications when a certain quota is exceeded by all the applications combined. But, none of the these tools and applications are able to distinguish which application or part of an application is causing the data usage, and when those applications are using services like Download Managers. Due to this ambiguity, tools and applications cannot attribute the data usage to a specific application or parts of the applications. Accordingly, it impossible to set a quota on a specific application and on specific parts of the applications.

This inability to attribute network data usage exists for any type of computing device running applications whether mobile computing devices or other types of computing devices such as a desktop computer, a set-top box, a gaming console, etc. Likewise, the need to determine data usage can apply to any type of computing device and to any network whether wireless or wired.

Accordingly, there is a need for determining, controlling, adapting, and reporting data usage for specific application and features of applications that are running on computing devices and exchanging data with networks.

SUMMARY

Embodiments of the present teachings relate to a method for determining and controlling network data usage in a computing device. The method includes receiving a request to establish a connection across a network by an application executing on the computing device. The method further includes identifying a communication channel of the connection to be utilized by the application to exchange data over the network, and associating a tag with the communication channel, wherein the tag identifies the application or features of the application and identifies a policy governing data being exchanged over the network. Additionally, the method includes determining an amount of data exchanged over the communication channel. The method also includes storing the amount of the data exchanged in a record associated with the tag.

Embodiments of the present teachings also relate to a computer readable storage medium embodying instructions for causing a processor to perform a method. The method includes receiving a request to establish a connection across a network by an application executing on the computing device. The method further includes identifying a communication channel of the connection to be utilized by the application to exchange data over the network, and associating a tag with the communication channel, wherein the tag identifies the application or features of the application and identifies a policy governing data being exchanged over the network. Additionally, the method includes determining an amount of data exchanged over the communication channel. The method also includes storing the amount of the data exchanged in a record associated with the tag.

Embodiments of the present teachings also relate to a computing device for determining and controlling network data usage. The computing device includes a processor; and a computer readable storage medium coupled to the processor and comprising instructions for causing the processor to perform a method. The method includes receiving a request to establish a connection across a network by an application executing on the computing device. The method further includes identifying a communication channel of the connection to be utilized by the application to exchange data over the network, and associating a tag with the communication channel, wherein the tag identifies the application or features of the application and identifies a policy governing data being exchanged over the network. Additionally, the method includes determining an amount of data exchanged over the communication channel. The method also includes storing the amount of the data exchanged in a record associated with the tag.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIGS. 3A-3F are generic block diagrams that illustrate several examples of determining and controlling the network data usage by the data usage service according to various embodiments of the disclosure.

DETAILED DESCRIPTION

For simplicity and illustrative purposes, the principles of the present teachings are described by referring mainly to examples of various embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various embodiments. Electrical, mechanical, logical and structural changes can be made to the examples of the various embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for determining, profiling, controlling, and adapting network data usage and associated cost in an intelligent and granular fashion. According to embodiments, an operating system (OS) of a computing device can include or operate in conjunction with a data usage service. The data usage service can determine the network data usage of applications and features of the applications and attribute the network data usage to the specific application and features of the specific application responsible for the network data usage. By determining the network data usage to specific applications and features of the specific applications, the data usage service can obtain a true picture of the network usage by the applications of the computing device. Likewise, the data usage service can control and adapt the network data usage of specific applications to prevent overages in network data usage while allowing greater flexibility in data usage by important or desired applications or features.

Figure 1:
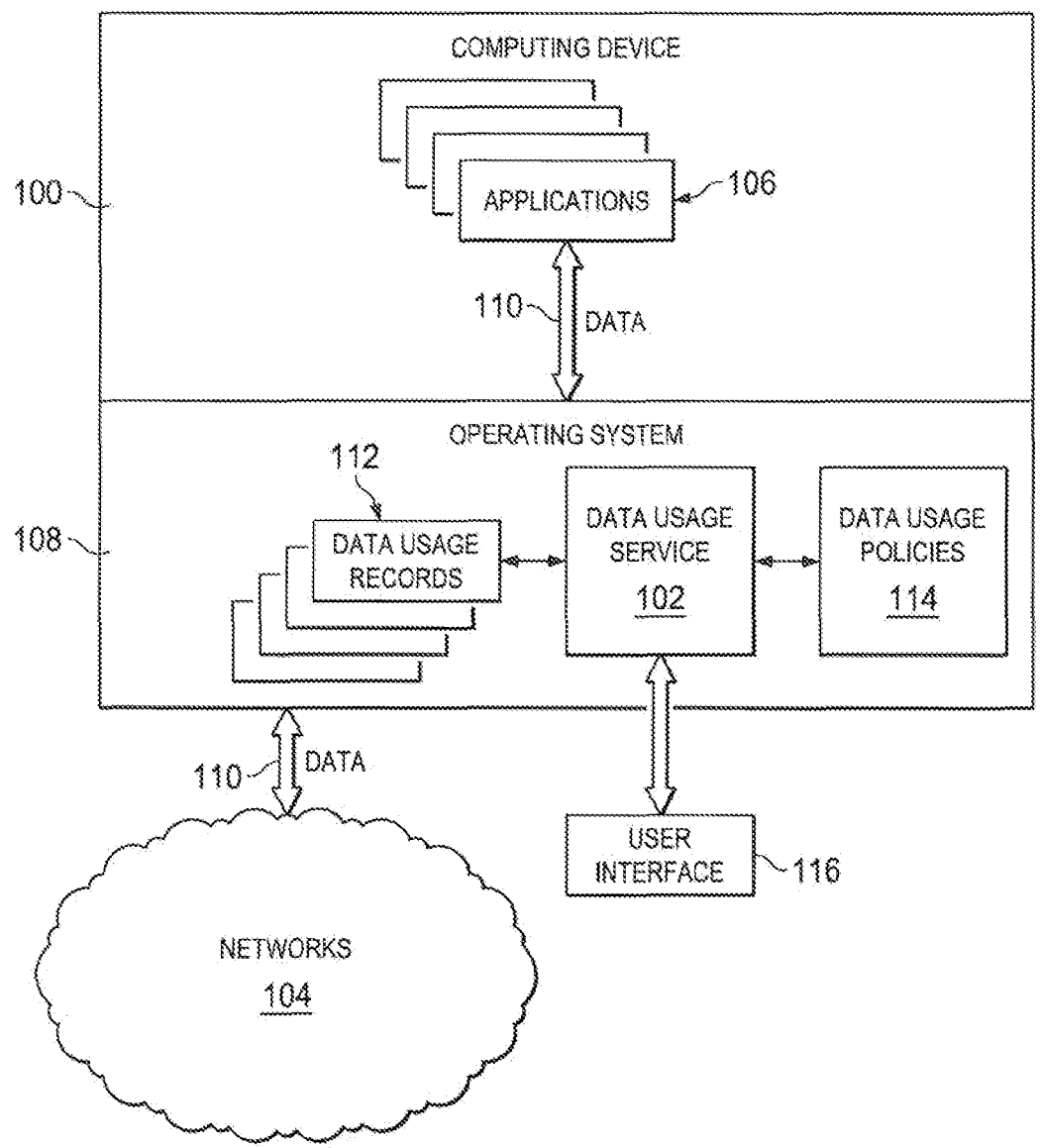
FIG. 1 is a generic block diagram that illustrates a computing device that includes a data usage service, according to embodiments of the disclosure.

FIG. 1 illustrates a computing device 100 that includes a data usage service 102, which can determine, profile, control, and adapt data usage associated with networks 104, according to various embodiments. While FIG. 1 illustrates various components contained in the computing device 100, one skilled in the art will realize that FIG. 1 is one example of the computing device 100 and that additional components can be added and existing components can be removed.

As illustrated, the computing device 100 can be any type of computing device that can run and execute applications 106. For example, the computing device 100 can be a cellular telephone, a personal digital assistant, a tablet computer, a media player device, a laptop computer, a thin client computer, a desktop computer, a server computer, a set-top box (e.g. cable or satellite), a game console, or other conventional computing devices. The computing device 100 can include hardware found in conventional computing devices, such as one or more processors, computer readable storage media (e.g. volatile and non-volatile memory, storage devices, etc.), network hardware (e.g. wired network cards, wireless networks cards, radio receivers and transmitters), video hardware, and input/output hardware.

The computing device 100 can communicate with the networks 104 utilizing the network hardware of the computing device 100. The networks 104 can be any types of networks, whether wired or wireless, that supports the exchange of data between computing devices. While the following description describes that computing device 100 can communicate with multiple networks, one skilled in the art will realize that the computing device 100 can communicate with any number of networks whether one or more.

The computing device 100 can store and execute an operating system (OS) 108. The OS 108 can include one or more software programs and modules that manage the hardware resources of the computing device 100. The OS 108 can provide common services for the applications 106. The OS 108 can be any type of known proprietary and/or open-source operating system that can be stored on one or more of the computer readable storage media of the computing device 100 and that can be executed by the computing device 100.

During execution, the applications 106 can connect to one or more of the networks 104 and exchange data with the networks 104. For example, an email application can send and receive emails via one or more of the networks 104; a web browser application can access websites via one or more of the networks 104; a media player can download media files via one or more of the networks 104; and the like.

Due to various reasons, the computing device 100, a user of the computing device 100, or both can desire to determine and control the usage of one or more of the networks 104 by the applications 106 to send and receive data. For example, if the computing device 100 is charged a fee for exchanging data with one or more of the networks 104, the computing device 100 or a user of the computing device 100 can desire to determine and control the network data usage of the applications 106 in order to identify and control the cost of using the networks 104. Likewise, for example, the computing device 100 or a user of the computing device 100 can desire to determine and control the network data usage of the applications 106 to optimize the connections to the networks 104 for the applications 106. One skilled in the art will realize that the computing device 100 and users of the computing device 100 can desire to determine and control network data usage for any number of reasons.

According to embodiments, the computing device 100 can include a data usage service 102. The data usage service 102 can determine the network data usage of applications 106 and features of the applications 106 when exchanging data with the networks 104. The data usage service 102 can attribute the network data usage to the applications 106 and features of the applications 106 responsible for the network data usage. By determining the network data usage of the applications 106 and features of the applications 106, the data usage service 102 can obtain a true picture of the network usage by the applications 106 running on the computing device 100. Likewise, the data usage service 102 can control and adapt the network data usage of the applications 106 and features of the applications 106 to prevent overages in network data usage while allowing greater flexibility in network data usage by the applications 106. Additionally, the users of the computing device 100 can obtain a complete picture of network data usage by the applications 106 and features of the applications 106 when exchanging data with the networks 104.

The data usage service 102 can be implemented as one or more software programs, modules, or both that are configured to be executed by the computing device 100 to perform the processes as described herein. The data usage service 102 or parts of the data usage service 102 can be implemented as a portion of other software programs, such as the OS 108. Likewise, the data usage service 104 or parts of the data usage service 102 can be implemented as stand-alone software programs, modules, or both. In any implementation, the data usage service 102 can be configured to include the necessary logic, commands, instructions, and protocols to perform the processes described herein. In any implementation, the data usage service 102 can be written in any type of conventional open-source and/or proprietary programming language. Copies of the data usage service 102 can be stored on one or more of the computer readable storage media of the computing device 100.

According to embodiments, the data usage service 102 can determine, control, and adapt an overall network data usage of one or more of the applications 106 and features of the applications 106. The data usage service 102 can uniquely associate a communication channel used by the applications 106 or features of the applications 106 with: an identification of the applications 106 and features of the applications 106, and any policies that govern the applications' 106 and features' network data usage. The communication channel can be any type of logical communication channel that the applications 106 utilize to exchange data with the networks 104. For example, the communication channels can be network sockets used by the applications 106 or other levels of application programming interface (API) abstractions.

When an application 106 and features of the application 106 requests a network connection to one of the networks 104, the data usage service 102 can associate one or more tags with a communication channel created for the application 106 and the features of the application 106 to exchange data 110 over the network connection. The one or more tags can uniquely identify the application 106 and the features of the application 106 and any policies that govern the application's 106 or feature's network data usage.

When the data 110 is received at the communication channel, the data usage service 102 can label the data 110 with one or more tags associated with the communication channel. The data usage service 102 can then determine an amount of the data 110 received at the communication channel and record the amount of the data 110 in one or more data usage records 112 associated with the one or more tags. The same procedure can be performed for each of the applications 106 or features of the applications 106 as each of the applications 106 or features of the applications 106 requests a network connection, and a communication channel is created. As such, the data usage service 102 can identify and determine the network data usage by each of the applications 106 or features.

According to embodiments, the data usage records 112 can be any type of data structure that can be associated with a tag and the one or more networks 104 used to exchange data and that can store the amount of the data 110 exchanged with the networks 104. The data usage records 112 can be stored on one or more of the computer readable media of the computing device 100.

According to embodiments, a policy governing network data usage (data usage policy), utilized by the data usage service 102, can include any information necessary to identify a condition present in an application's 106 network data usage or feature's network data usage and one or more actions to take once the condition occurs. The data usage policy can include an identification of one or more of the networks 104 subject to the policy, a condition in the network data usage that invokes the data usage policy, and one or more actions to take in response to the condition. The condition can be any condition occurring in the network data usage for one or more of the networks 104, for example, any network data usage, a defined amount of network data usage, and the like. The condition, for example, can be a quota that specifies an amount of network data usage within a period of time. For example, a quota can specify MBytes used per day, MBytes user per week, GBytes used per month, and the like. The one or more actions, taken in response to the condition, can be any action associated with an application's 106 network data usage, a feature's network data usage, or both. For example, the action can include blocking or limiting an application's 106 or feature's use of one or more of the networks 104, altering the rate at which the application 106 or the feature can exchange data with one or more of the networks 104, altering the quality of service of the connection to one or more of the networks 104, switching the application's 106 or feature's connection to different ones of the networks 104.

According to embodiments, the data usage service 102 can maintain the data usage policies in a data usage policies record 114. The data usage policies record 114 can be any type of data structure that can store the data usage policies. The data usage policies record 114 can be stored on one or more of the computer readable media of the computing device 100.

According to embodiments, the data usage service 102 can control and adapt the data usage of the applications 106 and features of the applications 106 using the amount of network data usage recorded in the data usage records 112 and using the data usage policies record 114. When the data usage is recorded for an application 106, features of the application 106, or both, the data usage service 102 can compare the amount of data recorded in the data usage records 112, for the application 106, features, or both, to the data usage policies that govern the application's 106 or features network data usage, which are stored in the data usage policies record 114. If the amount of network data usage meets a condition specified in the data usage policies, the data usage service 102 can perform the one or more actions that are specified in the policy. Accordingly, the data usage service 102 can control and adapt the activities of the applications 106 and the features of the applications 106 based on conditions occurring in the network data usage.

According to embodiments, the data usage service 102 can provide notifications, such as warnings and alerts, that the condition has occurred and an action has been taken. The data usage service 102 can also provide notifications on a current level of network data usage by the applications 106 and the features of the application 106. The data usage service 102 can generate a user interface 116 to provide the notification and receive information from the user of the computing device 100. In implementations, the data usage service 102 can notify the application 106, and the application 106 can generate the user interface 116. The user interface 116 can be any type of interface that can provide information to the user and receive information from the user, such as a graphical user interface (GUI), and command line interface, and the like. The data usage service 102 can provide the user interface 116 in a display device of the computing device 100. While FIG. 1 illustrates a single user interface 116, one skilled in the art will realize that the data usage service 102 can generate and provide any number of user interfaces.

In addition to determining and controlling the overall data usage, the data usage service 102 can classify and determine the applications 106 based on a context. The context can be related to the manner within which the applications 106 execute on the computing device 100, to the network which the application is utilizing to exchange data, to activities being performed by the applications 106, to user defined situations, or combinations of these contexts. For example, a context can be related to whether a specific application 106 is executing in the foreground or background, or has been singled out by a user. Likewise, for example, a context can be related to each of the networks 104 with which the application 106 can utilize to send and receive data. When an application 106 requests a network connection, the data usage service 102 can associate a tag with the communication channel created for the application 106 that can uniquely identify the application 106 and the context of the application 106.

When the data 110 is received at the communication channel, the data usage service 102 can label the data 110 with the tag associated with the communication channel. The data usage service 102 can then determine the amount of data being communicated over the communication channel and record the amount of data in one or more of the data usage records 112 associated with the tag, which identifies both the application 106 and the context. If the application 106 switches context, the data usage service 102 can determine and separately store the amount of network data usage in a record of the data usage records 112 that is associated with the context within which the network data usage occurred. Accordingly, the data usage service 102 can determine the overall data usage of the application 106 as well as the network data usage in each context.

Likewise, the data usage service 102 can provide notifications that identify the overall data usage of an application 106 as well as data usage in any relevant context associated with the application 106. For example, the data usage service 102 can provide the notifications in the user interface 116.

According to embodiments, the policies governing data usage can be associated with different contexts. When identifying policies to be associated with an application 106, the data usage service 102 can utilize the context associated with the application to identify which data usage policies should be applied to the application's 106 data usage determined by the data usage service 102. As such, the data usage service 102 can determine and control data usage based on the specific context of an application 106.

As discussed above, in addition to determining and controlling the network data usage of an application 106, the data usage service can determine, control, adapt, and report the network data usage of features of the application 106. The data usage service 102 can utilize sub-categories that identify the different features of each of the applications 106. To determine the network data usage, the data usage service 102 can associate a tag with the communication channel that identifies the application 106 and any policies that govern the application's 106 network data usage, and can associate the communication channel with a separate tag that identifies a sub-category for the feature using the communication channel and any policies that govern the feature's network data usage.

When the data 110 is received at the communication channel, the data usage service 102 can label the data 110 with all the tags associated with the communication channel. The data usage service 102 can then determine the amount of data received at the communication channel and record the amount of data usage in separate records in the data usage records 112 associated with the each tag, e.g. a record in the data usage records 112 showing data usage by the application 106 and a record in the data usage records 112 showing data usage by the feature of the application 106.

If a different feature classified under a different sub-category provides the data 110 to the communication channel, the data usage service 102 can associate the communication channel with a tag that identifies the application 106 and any policies that govern the application's 106 network data usage, and can associate the communication channel with a new tag that identifies a different sub-category for the different feature using the communication channel and any policies that govern the different feature's network data usage. Accordingly, the data usage service 102 can determine both the overall network data usage of each of the applications 106 as well as the network data usage by each feature of the applications 106. Further, the data usage service 102 can control and adapt the network data usage by each feature of each of the applications 106.

According to embodiments, the data usage service 102 can provide notification of the applications' 106 overall network data usage and network data usage by each feature. The data usage service 102 can provide the notification in the user interface 116.

According to embodiments, the data usage service 102 can utilize both context and sub-categories as well as other attributes, to determine, control, and adapt the network data usage of each of the applications 106 and the features of the application 106. The data usage service 102 can determine and record the network data usage for each of the applications 106, the context of each of the applications 106, and the sub-categories for the features of the applications 106. Accordingly, the data usage service 102 can provide an overall and detailed view of the network data usage of the applications 106.

According to embodiments, when determining network data usage, the data usage service 102 can automatically associate the tags with the communications channel and vice versa. Likewise, the applications 106 can communicate with the OS 108 to associate tags with the communications channel. As such, the applications 106 that provide network services to other ones of the applications 106 can properly attribute the network data usage to the correct application. In implementations, the application 106 can request that the data usage service 102 update the data 112 to properly attribute the network data usage to the correction application after data 110 has already been processed.

According to embodiments, the different contexts and data usage polices associated with the different contexts can be predefined by the data usage service 102. Likewise, for each predefined context, the data usage service 102 can allow a user of the computing device 100 to set the data usage policies for the predefined context. For example, the data usage service 102 can allow a user to identify network 104 subject to a data usage policy, the conditions of the policy, and the action to take if the conditions occurs. Additionally, the data usage service 102 can allow a user of the computing device 100 to set the policies governing network data usage for any of the applications 106 and features of the applications 106. Accordingly, the data usage service 102 can allow users to control the network data usage of the applications 106, features of the application 106, and any of the applications 106 associated with a context.

According to embodiments, the sub-categories associated with features of the applications 106 can be defined by a developer of the applications 106. When determining and controlling network data usage in the application 106, the data usage service 102 can identify the sub-categories by examining the applications 106. Accordingly, developers of the applications 106 can specify and define the features of the application 106 for which the network data usage is determined and controlled by the data usage service 102.

FIGS. 2A-2D illustrate several examples of processes that can be performed by the data usage service 102 in order to determine, control, and adapt network data usage in the computing device 100, according to various embodiments. While FIGS. 2A-2D illustrate various processes that can be performed by the data usage service 102, one skilled in the art will realize that any of the processes and stages of the processes can be performed by other components of the computing device 100. Likewise, one skilled in the art will realize that the illustrated stages of the processes are examples and that any of the illustrated stages can be removed, additional stages can be added, and the order of the illustrated stages can be changed.

Figure 2A:
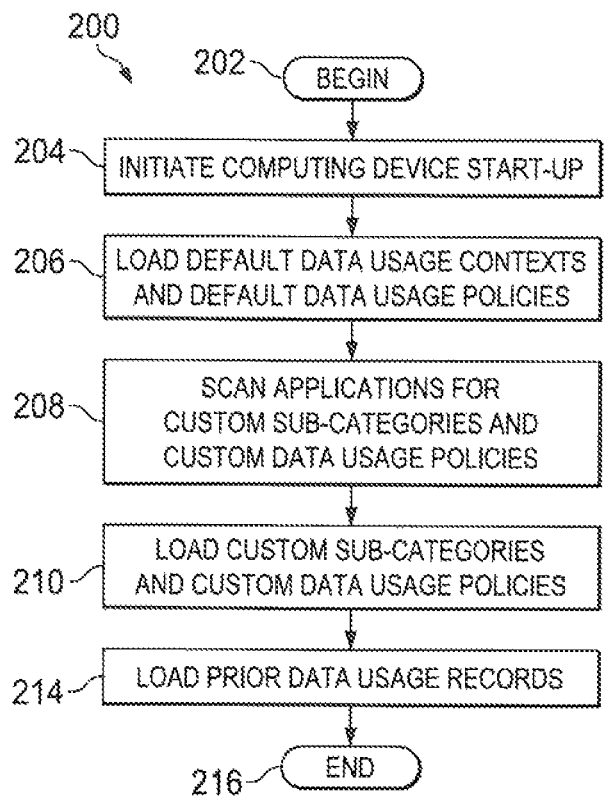
FIGS. 2A-2D are flow diagrams that illustrate examples of processes that can be performed by the data usage service according to various embodiments of the disclosure.

FIG. 2A illustrates an example of a process 200 that can be performed when the computing device 100 starts-up in order to initiate determining, controlling, and adapting network data usage, according to various embodiments. In 202, the process 200 can begin. The process 200 can begin in response to power-up of the computing device 100, to a restart of the computing device 100, and the like.

In 204, the OS 108 can initiate start-up of the computing device 100. The OS 108 can load and can initiate the software programs, modules, and applications necessary to allow operation of the computing device 100. The OS 108 can also load and initiate the data usage service 102.

In 206, the data usage service 102 can load default data usage contexts and default data usage policies. The data usage service 102 can retrieve the data usage policies record 114 and load the data usage policies record 114 for use in determining, adapting, and controlling the network data usage of the applications 106.

In 208, the data usage service 102 can scan the applications 106 for custom sub-categories and custom data usage policies. The applications 106 can specify custom sub-categories and custom data usage policies for the features of the applications. The data usage service 102 can scan the applications 106 to identify the custom sub-categories and the custom data usage policies.

In 210, the data usage service 102 can load the custom sub-categories and custom data usage policies. The data usage service 102 can store the custom sub-categories and the custom data usage policies in the data usage policies record 114.

In 214, the data usage service 102 can load prior data usage records 112. For example, prior to a shut down or restart, the data usage service 102 may have determined the network data usage of one or more of the applications 106 and the features of the applications 106. As such, the data usage service 102 can store the amount of network data usage in the data usage records 112, retrieve the previous values, and load the data usage records 112 with the previous value. In 216, the exemplary process 200 can end, return to any point or repeat.

Figure 2B:
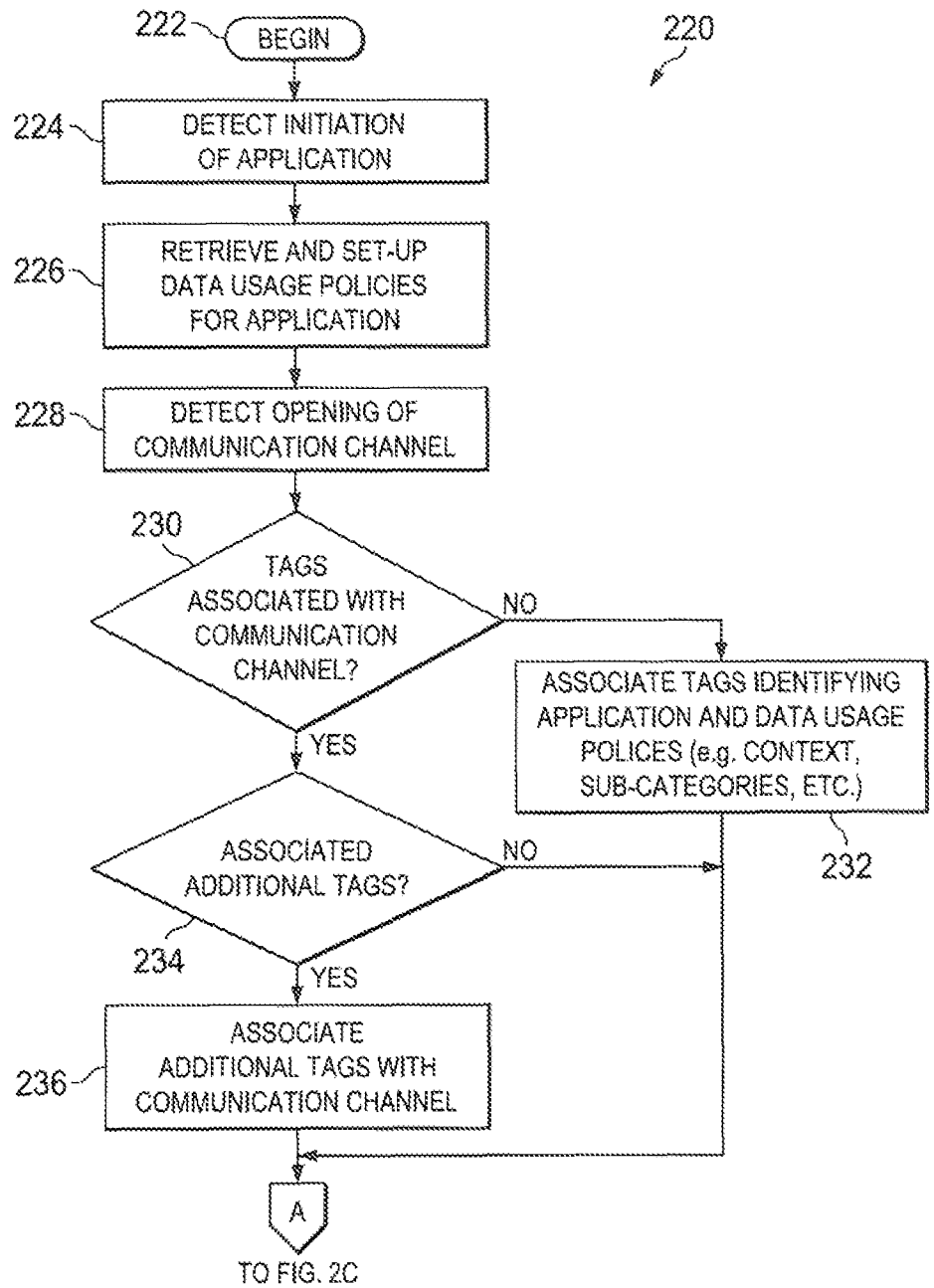
Figure 2C:
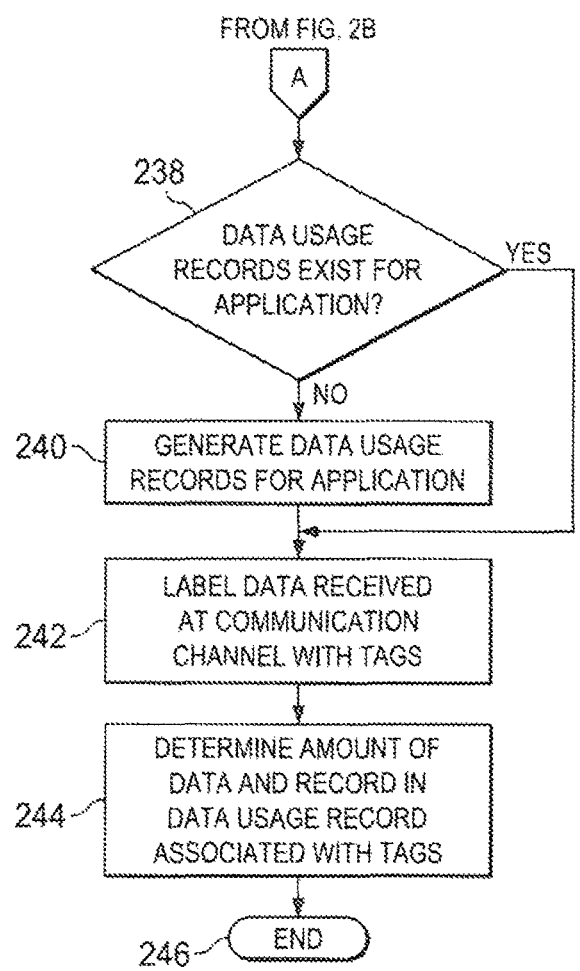

FIGS. 2B and 2C illustrate an example of a process 220 that can be performed by the data usage service 102 to determine network data usage according to various embodiments. In 222, the process 220 can begin.

In 224, the data usage service 102 can detect the initiation of an application 106. The application 106 can be initiated by a user of the computing device 100 or by the computing device 100, itself. In 226, the data usage service 102 can retrieve and set-up data usage policies for the application 106. The data usage service 102 can access the data usage policies record 114 to set-up the data usage policies for the application 106 and any features of the application 106.

In 228, the data usage service 102 can detect the opening of a communication channel. For example, when accessing one or more of the networks 104, the application 106 (or the OS 108) can open a communication channel to allow the exchange of data with the one or more networks 104. The communication channel can be any type of logical communication channel that the application 106 utilizes to exchange data with the networks 104. For example, the communication channels can be network sockets used by the application 106 or other levels of API abstractions.

In 230, the data usage service 102 can determine if one or more tags are associated with the communication channel. For example, the application 106 or another application 106 can associate the tags with the communication channel. For instance, the application 106 can utilize an intermediate application to access the networks 104, and the intermediate application can associate the tags with the communication channel. If no tags are associated with the communications channel, in 232, the data usage service 102 can associate the tags with the communication channel. The tags can identify the application 106, any relevant contexts, any relevant sub-categories, and any relevant data usage policies.

In 234, if one or more tags are already associated with the communication channel, the data usage service 102 can determine if additional tags should be associated with the communication channel. In 236, the data usage service 102 can associate the additional tags with the communication channel. For example, if an intermediate application assigned a tag identifying the application 106, the data usage service 102 can associate additional tags that identify any relevant contexts, any relevant sub-categories, and any relevant data usage policies, which were not associated by the intermediate application.

In 238, the data usage service 102 can determine if data usage records exist for the application 106. The data usage service 102 can examine the data usage records 112 to determine if records exist that match the tags associated with the communication channel. If the records do not exist, in 240, the data usage service can generate the data usage records 112.

In 242, the data usage service 102 can label the data received at the communication channel with the tags associated with the communication channel. In 244, the data usage service 102 can determine the amount of data received and store the amount of network data usage in the data usage records 112 associated with the tags.

In 246, the exemplary process 220 can end, return to any point or repeat.

Figure 2D:
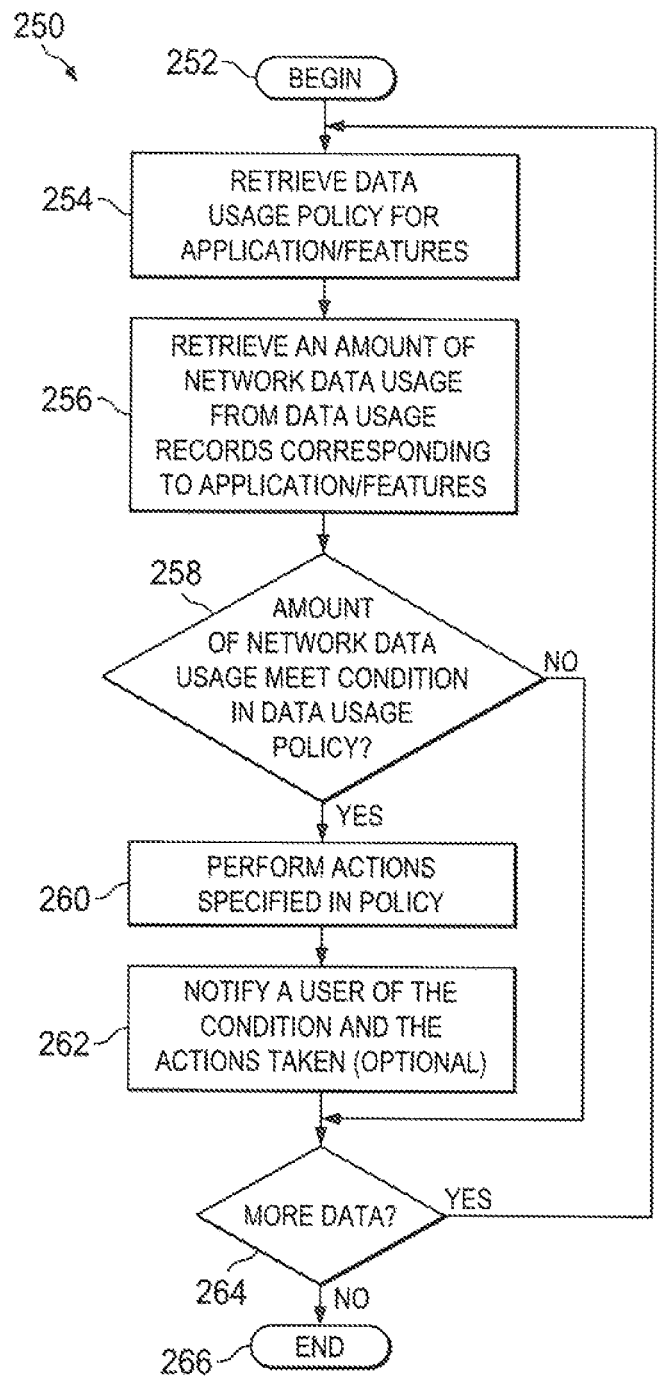

FIG. 2D illustrates an example of a process 250 that can be performed by the data usage service 102 to control and adapt network data usage, according to embodiments. In 252, the process 250 can begin. The process 250 can begin once data is received at a communication channel that has one or more tags.

In 254, the data usage service 102 can retrieve a data usage policy for an application 106 and any features that is identified by the tags of the communication channel. The data usage service 102 can search the data usage policies record 114 with the information in the tags and retrieve any data usage polices that are applicable.

In 256, the data usage service 102 can retrieve an amount of network data usage from the data usage records 112 corresponding to the application 106 and any features of the application 106. The data usage service 102 can identify one or more of the data usage records 112 using the information in the tags. Then, the data usage service 102 can retrieve the amount of network data usage from the identified data usage records 112.

In 258, the data usage service 102 can compare the amount of network data usage to any conditions for network data usage specified in the data usage policies. For example, the condition can be a quota that specifies an amount of network data usage within a period of time. For example, a quota can specify MBytes used per day, MBytes user per week, GBytes used per month, and the like. If the amount of network data usage does not meet any conditions, the data usage service 102 can check for more data received at the communication channel in 264.

If the amount of network data usage does meets a condition, in 260, the data usage service 102 can perform any actions specified in the policies with a matching condition. The action, taken in response to the condition, can be any action associated with the application's 106 network data usage, the feature's network data usage, or both. For example, the action can include blocking or limiting the application's 106 or feature's use of one or more of the networks 104, altering the rate at which the application 106 or the feature can exchange data with one or more of the networks 104, altering the quality of service of the connection to one or more of the networks 104, switching the application's 106 or feature's connection to different ones of the networks 104.

In 262, the data usage service 102 can optionally notify a user of the computing device 100 of any conditions met and any actions taken. For example, the data usage service 102 can provide the notification in the user interface 116.

In 264, the data usage service 102 can check for more data received at the communication channel. If more data is received, the data usage service 102 can return to 254 of the exemplary process 250. If no more data is received, the exemplary process 250 can end, return to any point or repeat.

As mentioned above, the data usage service 102 can determine and control the network data usage of one or more of the applications 106 using context and sub-categories. FIGS. 3A-3F illustrate several examples of determining and controlling the network data usage by the data usage service 102, according to various embodiments. While FIGS. 3A-3F illustrate various examples of network data usage determining and control, one skilled in the art will realize that the data usage service 102 can determine and control the network data usage of any application running on the computing device 100 using any combinations of context and sub-categories.

FIG. 3A illustrates an example of determining the network data usage of a social networking application 300 running on the computing device 100. The social networking application 300 can be used by a user of the computing device 100 to access a social networking website. The social networking application 300 can run on the computing device 100 in different contexts depending on the execution state of the social networking application 300. While the user is interacting with social networking application 300, the social networking application can run in the foreground and exchange data 302 with one or more of the networks 104. Likewise, while the user is not interacting with the social networking application 300, the social networking application 300 can run in the background and exchange data 304 with one or more of the networks 104.

According to embodiments, the data usage service 102 can maintain two contexts for the different execution states of the application 106. For example, the data usage application 102 can maintain a context A for determining the network data usage of applications 106, such as the social networking application 300, running in the foreground. For instance, as the user actively interacts with the social networking application 300, the social networking application 300 can run in the foreground and exchange the data 302 with one or more of the networks 104. Likewise, the data usage application 102 can maintain a context B for the applications 106 running in the background. For instance, the social networking application 300 runs in the background as the social networking application 300 passively checks for updates and exchanges the data 304 with one or more of the networks 104.

As the social networking application 300 exchanges the data 402 and the data 304, the data usage service 102 can utilize two separate data usage records: a data usage record 306 for determining the data 302 exchanged in context A and a data usage record 308 for determining the data 304 exchanged in the context B. To properly attribute the data to the correct context, the data usage service 102 can associate different tags with a communication channel being utilized by the social networking application 300 as the context changes. The tags associated with the communication channel can identify the current context of the social networking application 300, e.g. running in foreground or background.

As the data 302 or 304 is received at the communication channel, the data usage service 102 can identify the context from the tags and record the network data usage in the data usage records 306 or the data usage record 308 based on the tag currently associated with the communication channel. As such, the data usage service 102 can accurately account for the network data usage of the social networking application 300 in both context A and B, as well as the overall network data usage of the social networking application 300.

In this example, the data usage service 102 can control and adapt the network data usage of the social networking application 300 based on overall network data usage of the social networking application 300, the network data usage in context A, and the network data usage in context B. For instance, the data usage service 102 can utilize a policy that governs the overall network data usage of the social networking application 300, a policy that governs the network data usage in context A, and a policy that governs the network data usage in context B. For example, if the network data usage in the context B is considered less important, the policy for the context B can specify that the context B has a lower quota than context A and can specify that the data 304 is limited, blocked, given less priority, or transferred over a different one of the networks 104 when the quota is reached.

Figure 3B:
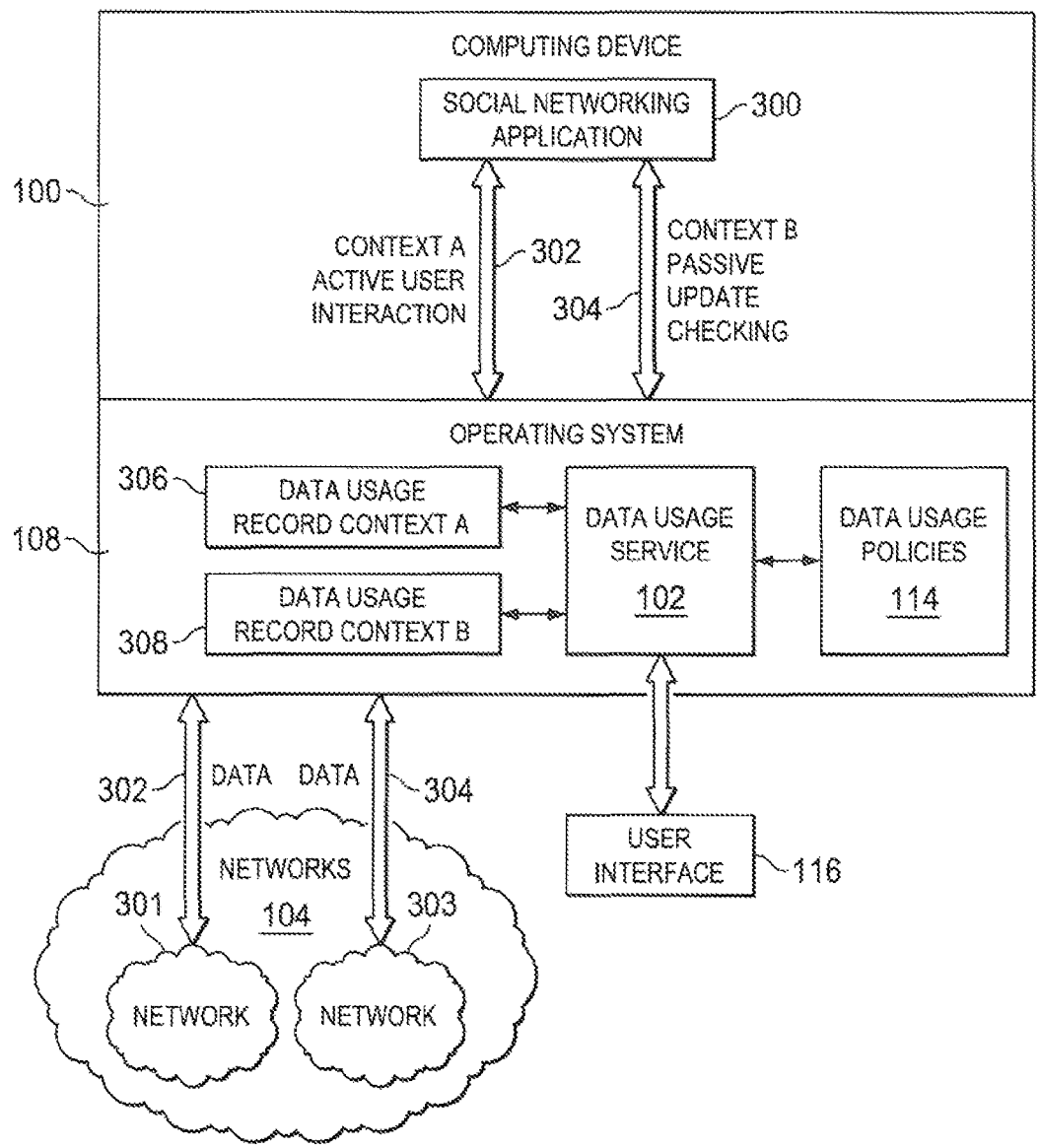

For example, as illustrated in FIG. 3B, the computing device 100 can communicate with two networks 104: a network 301 and a network 303. The network 301 can be a network that has a quota on the amount of data exchanged with the network before a fee is changed, for example, a cellular network. The network 303 can be a network that allows unlimited data exchange over the network, for example, a WiFi network. The data usage service 102 can utilize a policy that governs the overall network data usage of the social networking application 300, a policy that governs the network data usage in context A, i.e., the active user interaction, and a policy that governs the network data usage in context B, the passive update checking. If the data usage recorded in the data usage record 306 and the data usage record 308 (or other data usage records) reaches the quota, the policy can specify that any data usage for context B will be limited to the network 303. Accordingly, the computing device 100 can route the data 304 (or can instruct the OS 108 to route) to the network 303 until the quota is reset, for example, at the beginning of a new billing cycle.

Likewise, in another example, the policy for the context B can specify that the applications 106, e.g. the social networking application 300, running in the context B, e.g. the background, can only utilize a specific one of the networks 104, e.g. either the network 301 or the network 303. For instance, the policy for the context B can specify that the applications running in the context B can only utilize the network 303.

Figure 3C:
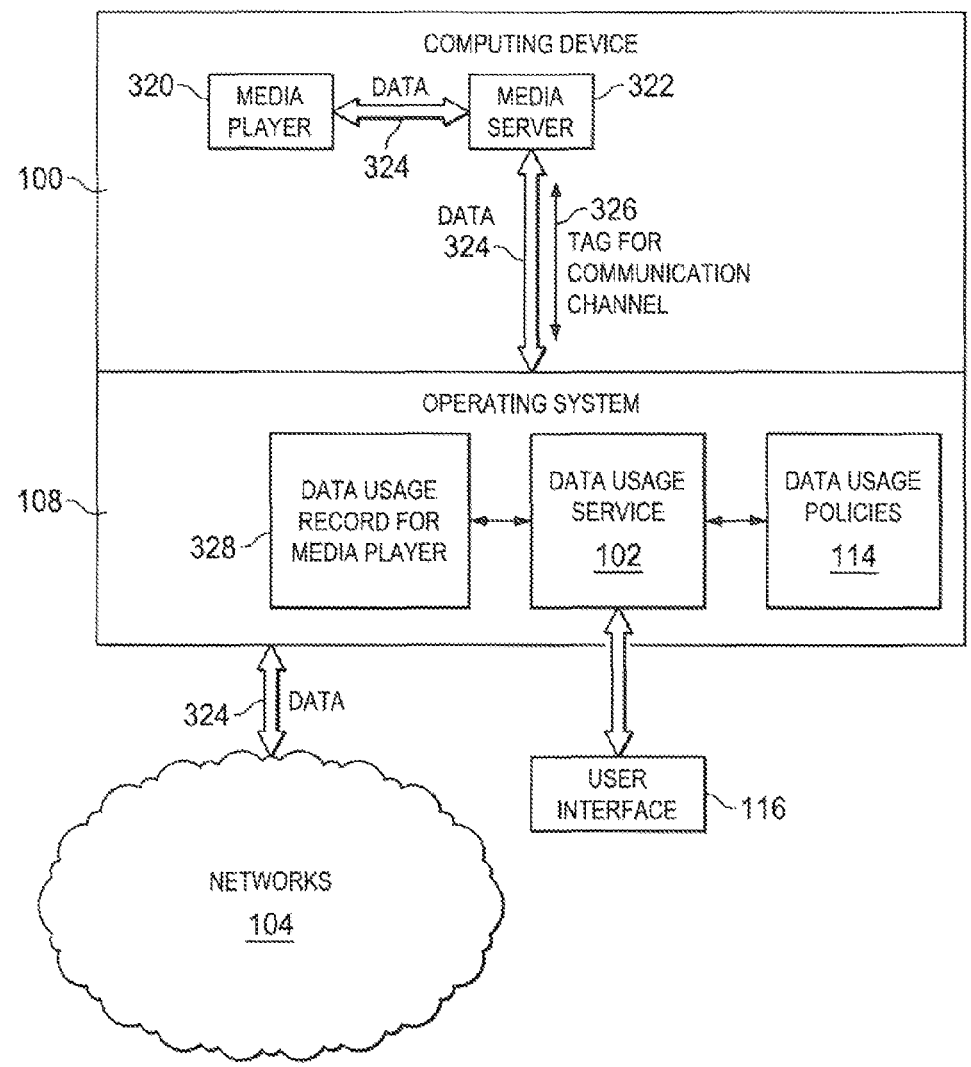

FIG. 3C illustrates an example of determining the network data usage of a media player 320 running on the computing device 100. In this example, the media player 320 can utilize another application, a media server 322, to exchange data 324 with one or more of the networks 104. In order to properly attribute the exchange of the data 324 to the media player 320, the media player 322 can associate the tag 326 with the communication channel. As such, when the data 322 is determined by the data usage service 102, the data usage service 102 can properly store the amount of network data usage in a data usage record 328 for the media player 320. As such, the data 324 can be attributed with the media player 320 even though the OS 108 or the data usage service 102 may assume the media server 322 is exchanging data with one or more of the networks 104.

Figure 3D:
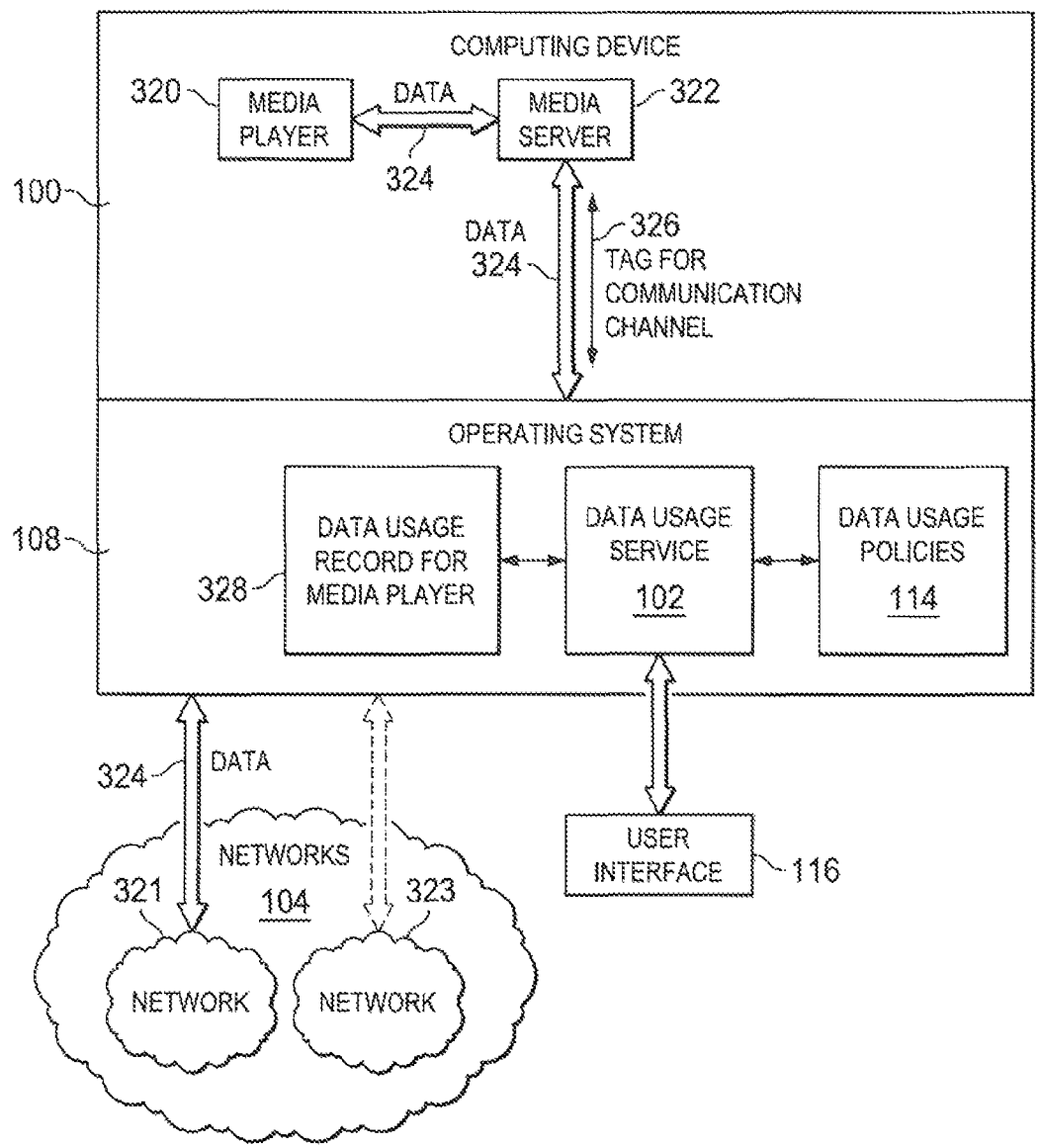

In this example, the data usage service 102 can control and adapt the network data usage of the media player 320 based on overall network data usage of the media player 320 and/or all application using the one or more networks 104. As illustrated in FIG. 3D, the computing device 100 can communicate with two networks 104: a network 321 and a network 323. The network 321 can be a network that has a quota on the amount of data exchanged with the network before a fee is changed, for example, a cellular network. The network 323 can be a network that allows unlimited data exchange over the network, for example, a WiFi network. The data usage service 102 can utilize a policy that governs the overall network data usage of the media player 300 and/or all application utilizing the networks 104. If the data usage recorded in the data usage record 306 and the data usage record 328 (or the combination of all data usage records) reaches the quota, the policy can specify that any data usage for the media player 320 will be limited to the network 323. Accordingly, the computing device 100 can route (or can instruct the OS 108 to route) the data 324 to the network 323 until the quota is reset, for example, at the beginning of a new billing cycle.

Figure 3E:
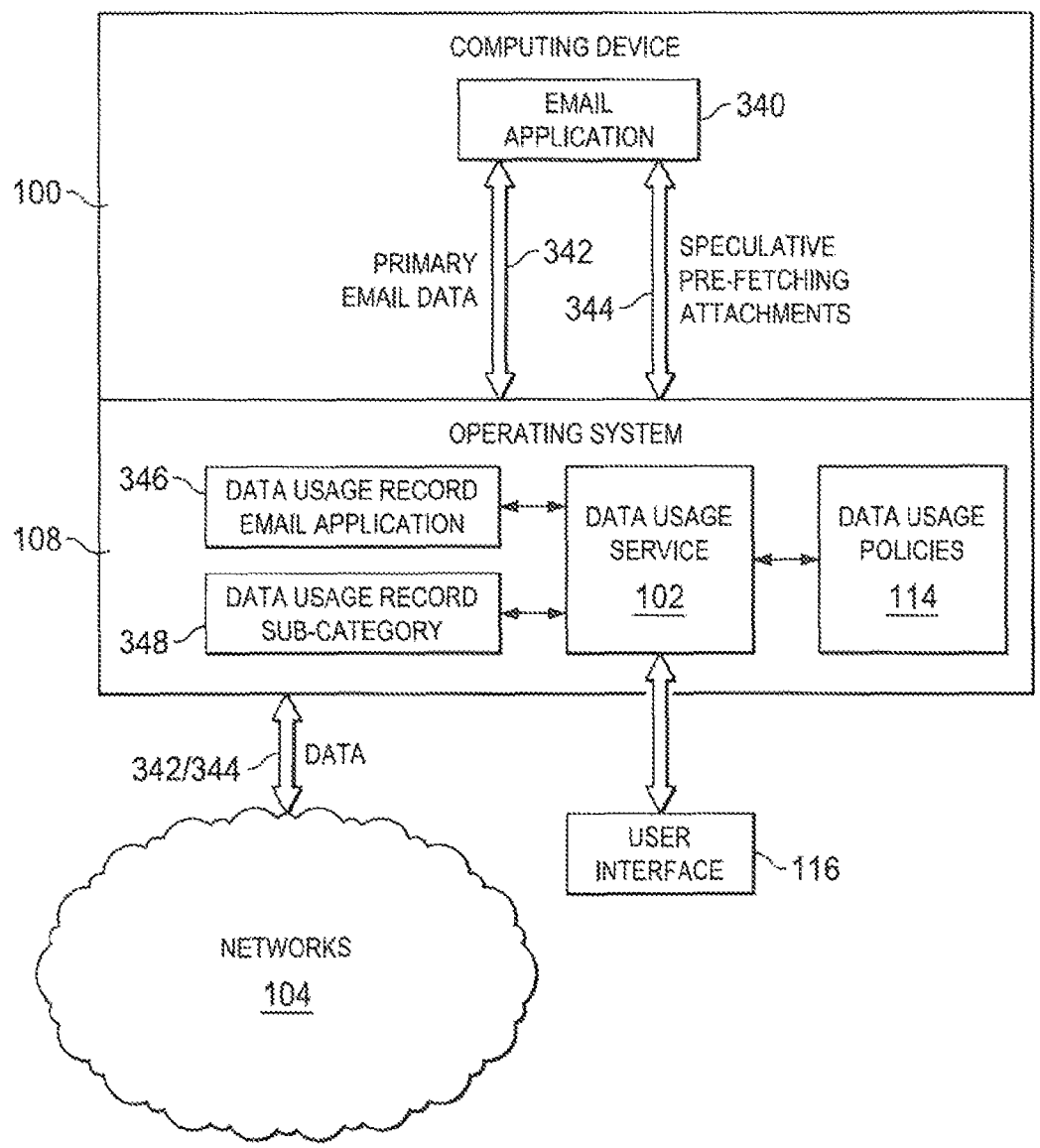

FIG. 3E illustrates an example of an email application 340 running on the computing device 100. In this example, the email application 340 can have different features for sending and receiving email. For instance, the email application 340 can include a feature that normally sends and receives email data 342. Likewise, the email application 340 can include a feature that speculative pre-fetches email attachments 344, even if the user has not decided to view the attachments. When developing the email application 340, the developer can realize that the pre-fetch of email attachments 344 can create a large amount of network data usage because email attachments typically are large. As such, the developer can assign a sub-category to the pre-fetch of email attachment 344.

As the email applications 340 exchanges the data 342 and the data 344, the data usage service 102 can utilize two separate data usage records: a data usage record 346 for determining all the data exchanged by the email application 340 and a data usage record 348 for determining the data 344 exchanged by the sub-category of the speculative pre-fetching of attachments 344. To properly attribute the data, the data usage service 102 can associate different tags with a communication channel being utilized by the email application depending on which features of the email application 340 are exchanging data. The tags associated with the communication channel can identify the current features exchanging data.

For instance, as the email application exchanges data 342 with one or more of the networks 104, the data usage service 102 can label the communication channel with a tag for the email application 340 and record the network data usage in the data usage record 346. As the email application exchanges data 344 with one or more of the networks 104, the data usage service 102 can label the communication channel with a tag for the email application 340 and a tag for the sub-category of the speculative pre-fetching of attachments 344. The data usage service 102 can record the network data usage in the data usage record 346 and the data usage record 348. As such, the data usage service 102 can accurately account for the network data usage of the speculative pre-fetching of attachments of the emails application 340, as well as the overall network data usage of the email application 340.

In this example, the data usage service 102 can control and adapt the network data usage of the email application 340 based on the data usage determined for each feature of the email application 340. As illustrated in FIG. 3F, the network 104 can be a network that has a quota on the amount of data exchanged with the network before a fee is changed, for example, a cellular network. The data usage service 102 can include a policy that blocks the speculative pre-fetching of attachments if the usage of the email application 340 reaches a threshold. Once the data usage stored in the data usage record 346 and the data usage record 348 reaches the threshold, the data usage service 102 can block (or can instruct the OS 108 to block) the data 344 related to the speculative pre-fetching of attachments. Likewise, for example, the data usage service 102 can route (or can instruct the OS 108 to route) the data 344 to another network in in the networks 104.

In this example, the data usage service 102 can control and adapt the network data usage of the email application 440 based on overall network data usage of the email application 440 and the network data usage of the feature of speculative pre-fetching of attachments 444. For instance, the data usage service 102 can utilize a policy that governs the overall network data usage of the email application 400 and a policy that governs the network data usage of the feature of speculative pre-fetching of attachments 444.

Figure 4:
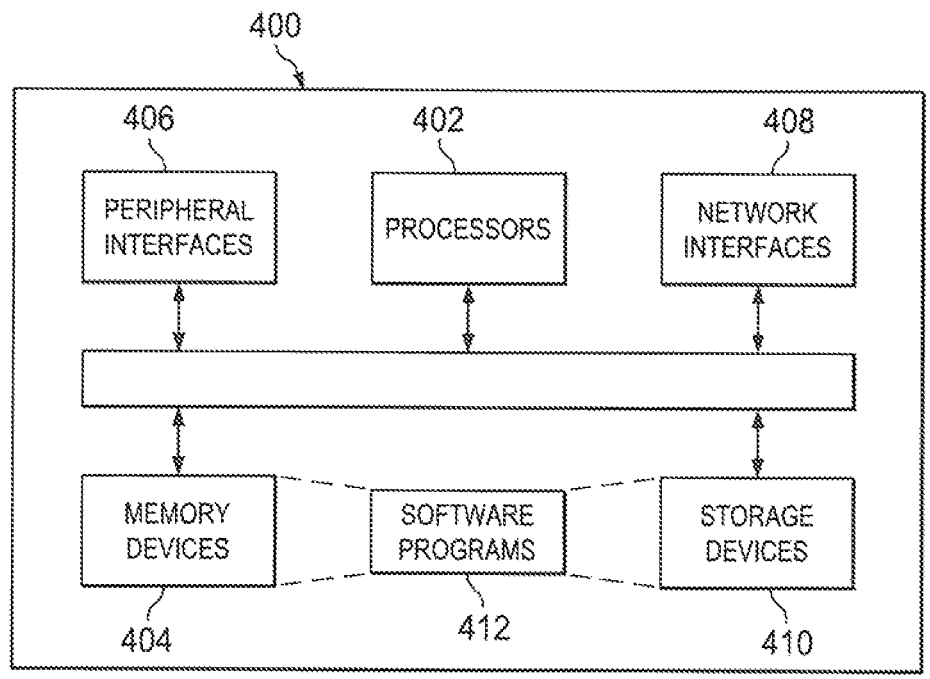
FIG. 4 is a block diagram of an example of a computing device, according to various embodiments.

FIG. 4 is a diagram depicting an exemplary hardware configuration for a computing device 400, such as the computing device 102, that may be used to perform one or more of the processes described above. While FIG. 4 illustrates various components contained in the computing device 400, one skilled in the art will realize that FIG. 4 is one example of a computing device and that additional components can be added and existing components can be removed.

As illustrated in FIG. 4, the computing device 400 can include one or more processors 402 of varying core configurations and clock frequencies. The computing device 400 can also include one or more memory devices 404 that serve as a main memory during the operation of the computing device 400. The computing device 400 can also include one or more peripheral interfaces 406, such as keyboards, mice, touchpads, computer screens, touchscreens, etc., for enabling human interaction with and manipulation of the computing device 400.

The computing device 400 can also include one or more network interfaces 408 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. The computing device 400 can also include one or more storage device 410 of varying physical dimensions and storage capacities, such as flash drives, hard drives, random access memory, etc., for storing data, such as images, files, and program instructions for execution by the one or more processors 402. One or more software programs 412 can be stored in the one or more memory devices 404 and/or on in the one or more storage devices 410. For example, the one or more software program can include the OS 108, the data usage service 102, and any other software program utilized by the computing device 100.

In embodiments, the components of the computing device 400 need not be enclosed within a single enclosure or even located in close proximity to one another. Those skilled in the art will appreciate that the above-described componentry are examples only, as the computing device 400 can include any type of hardware componentry, including any necessary accompanying firmware or software, for performing the disclosed embodiments. The computing device 400 can also be implemented in part or in whole by electronic circuit components or processors, such as application-specific integrated circuits (ASICs) or field-programmable gate arrays (FPGAs).

Certain embodiments described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for determining and controlling network data usage in a computing device, comprising:
receiving, by a computing device, a request to establish a connection across a network by an application executing on the computing device;
identifying, by the computing device, a communication channel of the connection to be utilized by the application to exchange data over the network;
associating, by the computing device, a first tag with the communication channel, wherein the first tag identifies the application and identifies a policy governing data being exchanged over the network;
determining, by the computing device, an amount of data exchanged over the communication channel;
storing, by the computing device, the amount of the data exchanged in a record associated with the first tag;

identifying a sub-category for the data being exchanged over the connection, wherein the sub-category relates to a data exchange feature of the application;

associating a second tag with the communication channel, wherein the second tag identifies the sub-category; and storing the amount of the data in a second record associated with the second tag.

2. The method of claim 1, the method further comprising:

retrieving the policy identified by the first tag, wherein the policy specifies a quota on an allowed amount of data being exchanged over the network by the application;

determining whether the amount of data exchanged over the communication channel exceeds the quota; and performing an action specified by the policy if the amount of data exchanged over the communication channel exceeds the quota.

3. The method of claim 2, wherein the action comprises at least one of preventing further data exchange over the connection by the application, changing a rate at which data is exchanged over the connection by the application, establishing a different connection to a different network for the application to exchange the data, and changing a quality of service of the connection.

4. The method of claim 1, the method further comprising:

receiving, via a user interface of the computing device, the policy governing data being exchanged over the network.

5. The method of claim 1, the method further comprising:

identifying a context associated with the application, wherein the first tag, associated with the communication channel of the connection, comprises an identification of the context.

6. The method of claim 1, the method further comprising:

identifying a second policy associated with the sub-category that specifies a second quota on an allowed amount of data exchanged over the network by the data exchange feature;

determining whether the amount of data exchanged over the communication channel exceeds the second quota; and preventing further data exchanged over the connection by the data exchange feature if the amount of data exchanged over the communication channel exceeds the second quota.

7. The method of claim 1, wherein a second application that is providing network services to the application associates the first tag with the communication channel.

8. A computer readable storage medium embodying instructions for causing one or more processors of a computing device to perform a method comprising:

receiving, by the computing device, a request to establish a connection across a network by an application executing on the computing device;

identifying, by the computing device, a communication channel of the connection to be utilized by the application to exchange data over the network;

associating, by the computing device, a first tag with the communication channel, wherein the first tag identifies the application and identifies a policy governing data being exchanged over the network;

determining, by the computing device, an amount of data exchanged over the communication channel;

storing, by the computing device, the amount of the data exchanged in a record associated with the first tag;

identifying a sub-category for the data being exchanged over the connection, wherein the sub-category relates to a data exchange feature of the application;

associating a second tag with the communication channel, wherein the second tag identifies the sub-category; and storing the amount of the data in a second record associated with the second tag.

9. The computer readable storage medium of claim 8, the method further comprising:

retrieving the policy identified by the first tag, wherein the policy specifies a quota on an allowed amount of data being exchanged over the network by the application;

determining whether the amount of data exchanged over the communication channel exceeds the quota; and performing an action specified by the policy if the amount of data exchanged over the communication channel exceeds the quota.

10. The computer readable storage medium of claim 9, wherein the action comprises at least one of preventing further data exchange over the connection by the application, changing a rate at which data is exchanged over the connection by the application, establishing a different connection to a different network for the application to exchange the data, and changing a quality of service of the connection.

11. The computer readable storage medium of claim 8, the method further comprising:

receiving, via a user interface of the computing device, the policy governing data being exchanged over the network.

12. The computer readable storage medium of claim 8, the method further comprising:

identifying a context associated with the application, wherein the first tag, associated with the communication channel of the connection, comprises an identification of the context.

13. The computer readable storage medium of claim 8, the method further comprising:

identifying a second policy associated with the sub-category that specifies a second quota on an allowed amount of data exchanged over the network by the data exchange feature;

determining whether the amount of data exchanged over the communication channel exceeds the second quota; and preventing further data exchanged over the connection by the data exchange feature if the amount of data exchanged over the communication channel exceeds the second quota.

14. The computer readable storage medium of claim 8, wherein a second application that is providing network services to the application associates the first tag with the communication channel.

15. A computing device for determining and controlling network data usage, comprising:

one or more processors; and a computer readable storage medium coupled to the one or more processors and comprising instructions for causing the one or more processors to perform a method comprising:

receiving, by the computing device, a request to establish a connection across a network by an application executing on the computing device;

identifying, by the computing device, a communication channel of the connection to be utilized by the application to exchange data over the network;

associating, by the computing device, a first tag with the communication channel, wherein the first tag identifies the application and identifies a policy governing data being exchanged over the network;

determining, by the computing device, an amount of data exchanged over the communication channel;

storing, by the computing device, the amount of the data exchanged in a record associated with the first tag;

identifying a sub-category for the data being exchanged over the connection, wherein the sub-category relates to a data exchange feature of the application;

associating a second tag with the communication channel, wherein the second tag identifies the sub-category; and storing the amount of the data in a second record associated with the second tag.

16. The computing device of claim 15, the method further comprising:

identifying a second policy associated with the sub-category that specifies a second quota on an allowed amount of data exchanged over the network by the data exchange feature;

determining whether the amount of data exchanged over the communication channel exceeds the second quota; and preventing further data exchanged over the connection by the data exchange feature if the amount of data exchanged over the communication channel exceeds the second quota.

17. The computing device of claim 15, wherein a second application that is providing network services to the application associates the first tag with the communication channel.

* * * * *